W. ZADOROZNY.
PIPE WRENCH.
APPLICATION FILED MAR. 13, 1919.
1,336,710.
Patented Apr. 13, 1920.
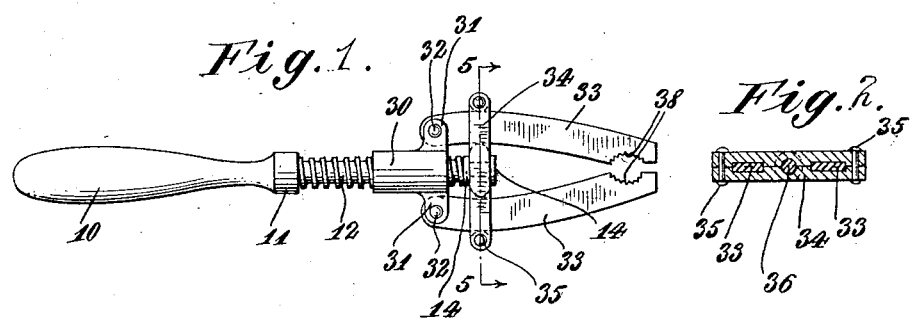
INVENTOR
Wasyl Zadorozny
BY
his ATTORNEY.

UNITED STATES PATENT OFFICE.

WASYL ZADOROZNY, OF MEACHAM, SASKATCHEWAN, CANADA, ASSIGNOR OF ONE-HALF TO TONY ZYGIEL, OF HAMILTON, ONTARIO, CANADA.

PIPE-WRENCH.

1,336,710.  Specification of Letters Patent.  Patented Apr. 13, 1920.

Application filed March 13, 1919. Serial No. 282,465.

*To all whom it may concern:*

Be it known that I, WASYL ZADOROZNY, a citizen of Austria, residing at Meacham, Province of Saskatchewan, and Dominion of Canada, have invented certain new and useful Improvements in Pipe-Wrenches, of which the following is a specification.

This invention relates to mechanics' tools and particularly to those used by pipe fitters in screwing pipes to form joints.

The principal object of the invention is to provide a tool which may be universally used upon pipes of an extremely large size or those of smaller diameter with equal facility.

A further object is to provide a tool of the class described, capable of readily engaging with ordinary pipes but which does not abrade or damage the appearance of the same.

These and other like objects are attained by the novel construction and combination of parts hereinafter described and shown in the accompanying drawings, forming a material part of this disclosure, and in which—

Figure 1 is a side elevational view of the tool.

Fig. 2 is a transverse sectional view taken on line 5—5 of Fig. 1.

The tool comprises a lever-like handle 10, adapted to be manually operated, the same being formed with a ferrule 11, in which is fixed a screw threaded bar 12, the screw thread being preferably square. The end of the bar has upon it raised annular collars 14.

The handle and screw threaded bar are engaged with a sleeve 30 from which extend opposite disposed pairs of lugs 31, and pivoting on the pin 32 therein are the ends of opposed lever jaws 33, the same passing through openings in a guide 34, formed in two parts and secured by rivets 35, the guide containing a central opening in which the reduced end 36 of the bar 12 enters, so that the collars 14 are disposed upon each side of the cross head 34, forming a bearing in which the threaded bar may freely rotate.

The outer ends of the lever bars 33 are concavely recessed, the surfaces of the recess being formed with sharp corrugations 38, adapted to grasp the exterior of a pipe in an obvious manner, and it will be evident that by rotating the handle and bar 12, within the guide head 34, the sleeve may be moved longitudinally along the bar, carrying the lever arms 33, which by their engagement within the head 34, are caused to approach or separate from each other at their outer ends, to suit pipes of different diameter, gripping the same firmly, the corrugations 38 acting in the manner of a pipe wrench so that the pipe may be turned by manipulating the handle 10.

From the foregoing it will be seen that an effective device of simple nature has been disclosed, which by the interchanging of heads and sleeves may be used in operating pipes of different diameters with equal facility.

Having thus described my invention what I claim is new and desire to secure by Letters Patent, is—

In a pipe fitter's tool, the combination with a manually operable handle, and a screw-threaded bar extending therefrom, of a guide formed in two parts riveted together, engaged at the end of said bar, collars on said bar at both sides of the said head, a sleeve engageable with said bar, a pair of oppositely disposed lugs at opposite sides or points of said sleeve, a pair of jaws movable in said head, pivotal connections between said jaws and said lugs, and means formed with said jaws for grasping the exterior of a pipe.

In testimony whereof I have affixed my signature.

WASYL ZADOROZNY.